United States Patent Office 3,546,038
Patented Dec. 8, 1970

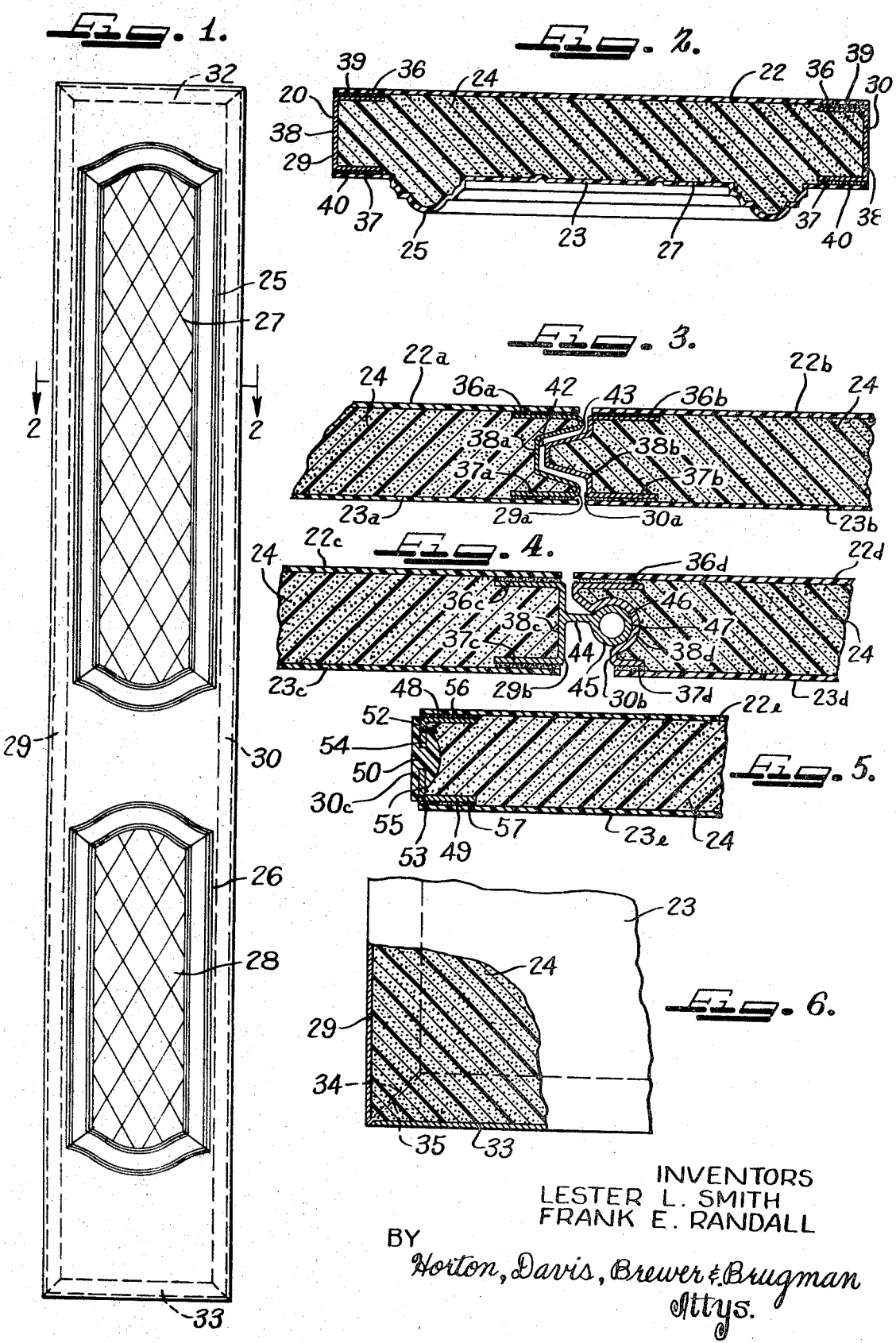

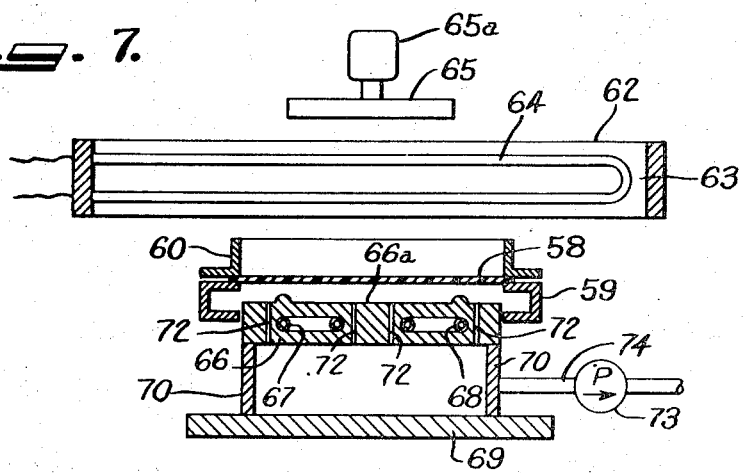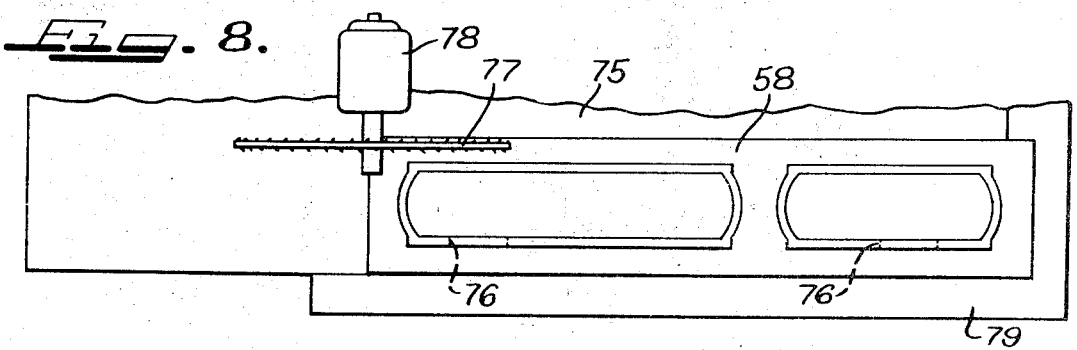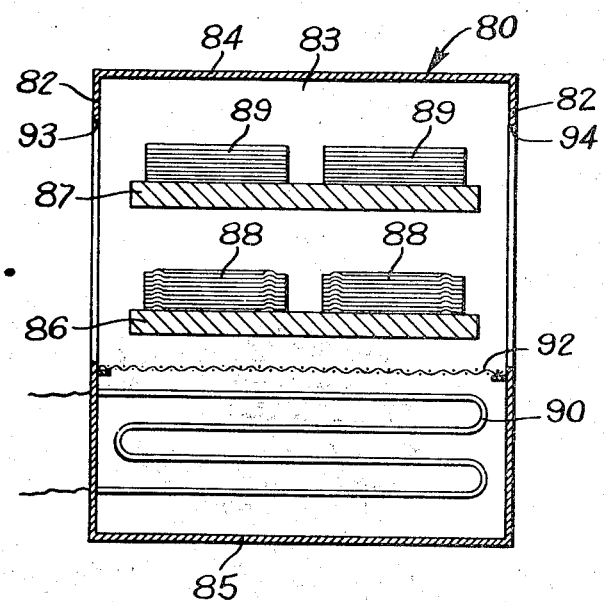

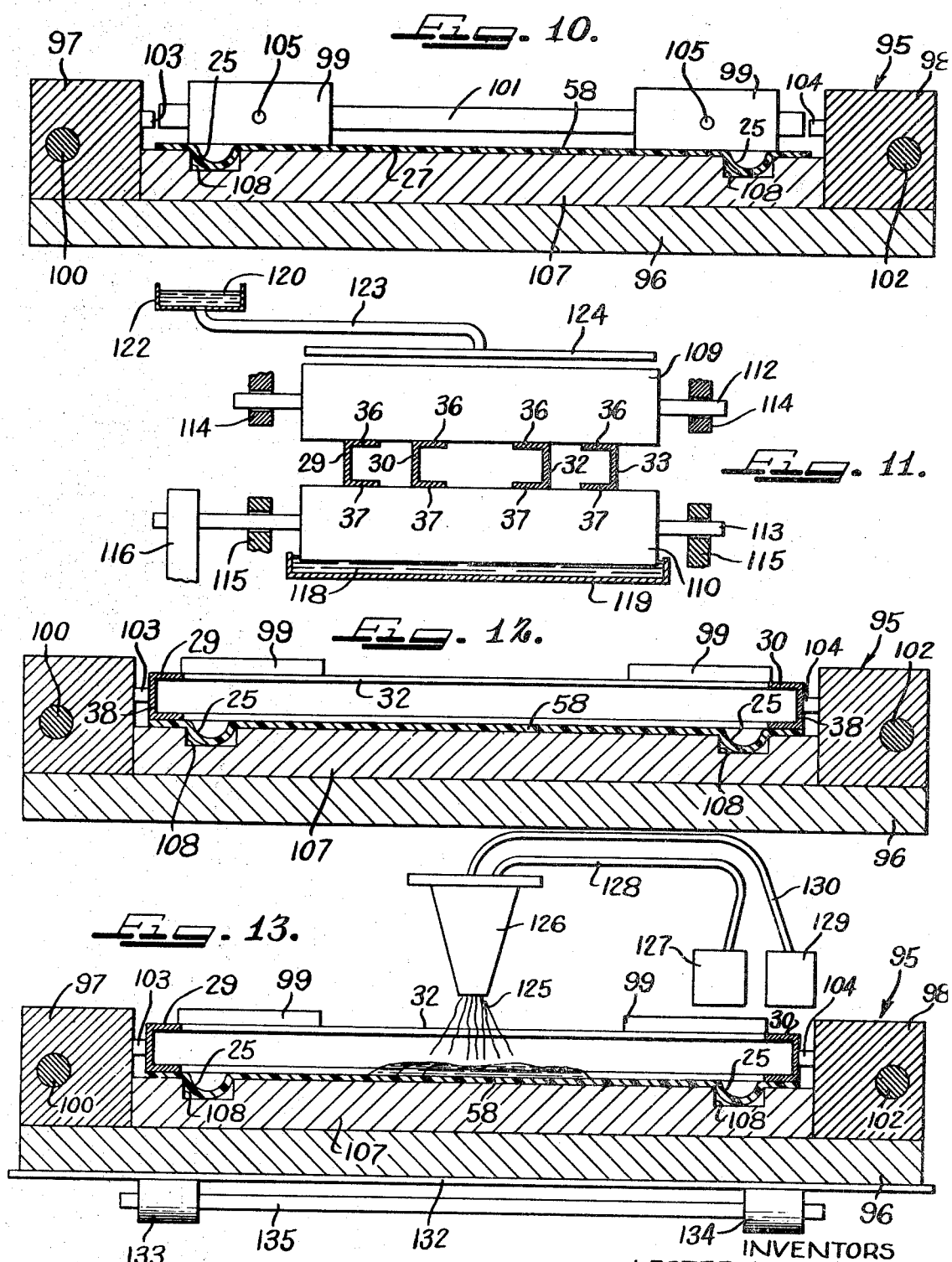

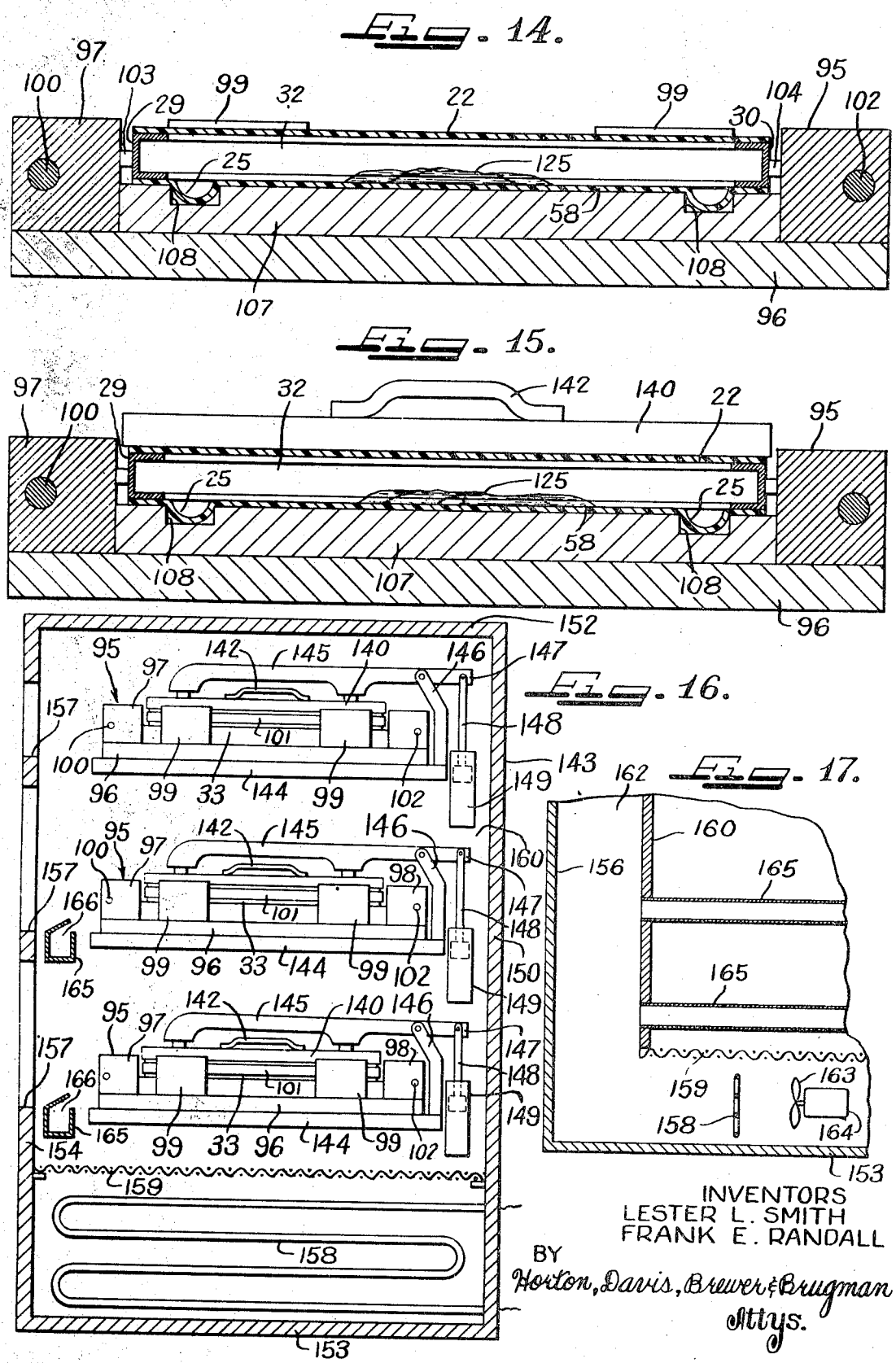

3,546,038
METHOD OF BONDING TWO PLASTIC LAMINAS FACE-TO-FACE AND WITHIN A FRAME STRUCTURE
Lester L. Smith and Frank E. Randall, Peoria, Ill., assignors, by mesne assignments, to Home Comfort Products Co., Princeville, Ill., a corporation of Illinois
Original application Feb. 15, 1966, Ser. No. 527,571. Divided and this application Dec. 23, 1968, Ser. No. 798,557
Int. Cl. B32b 31/14
U.S. Cl. 156—83                 10 Claims

ABSTRACT OF THE DISCLOSURE

A method of fabricating panels adapted to use in walls, or as doors or sections thereof and the like, and in which one relatively flexible plastic surface skin is marginally secured to a relatively stiff and rigid peripheral frame of greater thickness than the surface skin, after which a predetermined quantity of an uncured, expandable foam type plastic filler capable of curing to a stiff and lightweight state is distributed on the surface of the skin within the frame; a second relatively flexible plastic skin then being secured to the face of the frame opposite the first skin to confine the filler material within the frame and between the skins, and thereafter curing the filler material to substantially fill the space within the frame and between the skins while confining the outer surfaces of the skins between opposed rigid surfaces. Desirably, the filler material bonds itself to both the frame and skin surfaces. When heat is used in effecting the curing of the filler material, it is preferable to preheat the skins to cause processing expansion thereof and to keep them warm during the processing, thereby to avoid buckling of the skins during processing and to have the skins become taut when cooled after processing.

---

This invention relates to fabricated doors, panels and the like, and more particularly to such structures and the methods of fabrication thereof which, in addition to having excellent appearance and durability, are free of tendency to warp, and are strong and very light in weight.

The present application is a division of my application Ser. No. 527,571 filed Feb. 15, 1966, now abandoned.

One of the objects of this invention is to provide a structure for doors, panels and the like which is capable of fabrication at reasonably low cost and which has the qualities of good appearance, strength, durability, freedom from warping and light weight.

Another object of the invention is to provide a method of fabrication of doors, panels and the like having the aforementioned characteristics.

It is another object of this invention to provide a structure and method of fabrication for doors, panels and the like which embody a frame for strength and rigidity, heat formable and wear resistant plastic surface skins for appearance and durability and a light weight filler material which conforms intimately to the interior configurations of the plastic surface skins.

This invention further has within its purview the provision of a structure and method of fabrication for doors, panels and the like, wherein metal and different types of plastic parts are utilized and wherein the said parts are bonded together to constitute ruggedly composite and firmly unified ensembles.

As another object, this invention has within its purview the provision of a structure and method of fabricating plastic doors, panels and the like having channel-type metal or plastic frames extending peripherally of the structure.

Our invention also comprehends the provision of a structure and method of fabricating doors, panels and the like in which surface skins of plastic material are applied to supporting frames, and wherein such surface skins, in the finished structure are taut and wrinkle free.

It is another object of the invention to provide a structure and method of fabricating doors, panels and the like which embody surface skins adapted to both convex and concave embossed surface configurations together with a firm filler material which adapts itself to the surface configurations of the surface skins during fabrication.

These and other objects of this invention will become apparent from the following detailed description when taken together with the accompanying drawings in which:

FIG. 1 a front elevational view of a panel embodying a preferred form of our invention and made by our preferred method;

FIG. 2 is a sectional view drawn to a larger scale than FIG. 1 and taken substantially as indicated by a line 2—2 and accompanying arrows in FIG. 1;

FIG. 3 is a fragmentary sectional view of modified forms of panels and depicts a tongue and groove type of joinder for two adjacent panels;

FIG. 4 is a fragmentary sectional view similar to FIG. 3, but illustrative of modified forms of panels having a hinged type of connection therebetween;

FIG. 5 is a fragmentary sectional view of another modified form of panel adapted to use when heat insulation is a particular factor of consideration;

FIG. 6 is a fragmentary view drawn to a larger scale than FIG. 1, and showing a portion of the panel structure with parts broken away to illustrate the corner structure of the panel shown in FIG. 1;

FIG. 7 is a diagrammatic sectional view illustrative of apparatus utilized in one step of the disclosed method for forming a surface skin of our disclosed panel to provide an embossed design thereon;

FIG. 8 is a fragmentary and diagrammatic top plan view of one form of apparatus suitable for trimming one of the surface skins after being formed as shown in FIG. 7;

FIG. 9 is a diagrammatic end sectional view of apparatus adapted to use in preheating surface skins for panels made in accordance with the method disclosed herein;

FIG. 10 is an end sectional and diagrammatic view of apparatus used in the assembly of panels of the type disclosed herein when made in accordance with the method of this invention;

FIG. 11 is a diagrammatic end sectional view of apparatus adapted to use in applying adhesive to parts of our preferred panel structure when made in accordance with the herein disclosed method;

FIGS. 12 and 13 are diagrammatic end sectional views showing additional steps in the assembly of the panels of this invention as made in accordance with our preferred method;

FIGS. 14 and 15 are diagrammatic end sectional views similar to FIGS. 10, 12 and 13, which show additional steps in the assembly and production of our preferred panels when made in accordance with the disclosed method;

FIG. 16 is an end sectional and diagrammatic view of apparatus adapted to use in treating the panels of this invention when made in accordance with our disclosed method; and FIG. 17 is a fragmentary diagrammatic view of one corner portion of the apparatus depicted in FIG. 16.

In the exemplary embodiment of this invention which is disclosed herein for illustrative purposes, FIGS. 1 to 6, inclusive, of the drawings, disclose preferred and modified forms of structures adapted to use as fabricated doors, panels and the like, while FIGS. 7 to 17, inclusive, depict method steps and apparatus adapted to use in the fabrication of the structures shown in FIGS. 1 to 6, inclusive. FIGS. 1, 3 and 6 are illustrative of a preferred structure for the fabricated doors, panels and the like, which generally considered, comprise a peripheral frame 20, plastic surface skins 22 and 23 secured to opposite sides of the frame 20 and a filler 24 which fills the space within the frame 20 and between the surface skins 22 and 23. Depending upon the use and the ornamentation desired, one or both of the surface skins 22 and 23 may have integrally formed therein an embossed surface design, as exemplified by the formed frame portions 25 and 26 and the ornamented panel areas 27 and 28 included within the respective frames. Enumerable variations may, of course, be made in the types and details of designs used for such ornamentation. Also, whether one or both of the surface skins is to be ornamented depends, among other things, upon the use to which the door or panel structure is adapted. For example, embossed designs are usually used on only one side of a folding closet door structure, while ornamentation may be desired on both sides of a door or panel which may ordinarily be viewed from either side.

Considered in more detail, the plastic surface skins 22 and 23, and particularly such surface skins which are to be ornamented by an integral embossed design, may be made of a thermoformable plastic material, such as acrylonitrile butadiene styrene, poly vinyl chloride, polypropylene, polyethylene or polystyrene. The frame 20, in the disclosed structure, is made up of strips of a relatively rigid material of channel section having mitered ends which fit together to form a rectangle or other suitable geometric shape suited to the purpose for which the door or panel is adapted. As shown in FIGS. 1, 2 and 6, the frame includes side pieces 29 and 30 and end pieces 32 and 33. In the illustrated embodiment, the opposite ends of each of the frame pieces are mitered or cut at a 45° angle, so that they fit together to form a right angle, as shown in FIG. 6, wherein one end of the piece 29 has a mitered end 34 and one end of the piece 33 has a mitered end 35, which ends fit together in abutting relationship to form a right angle. The frame pieces 29, 30, 32 and 33 may be made of metal or of another relatively rigid material, such as extruded plastic.

The filler 24 which occupies the space between the metal frames and between the surface skins in the structure disclosed is desirably a gas expanded type of a relatively hard or rigid plastic material of either the closed or open cell variety, or a cellular plastic matrix expanded by the use of an inert or reactive gas, such as polyurethane or polymeric urethane containing small closed or open cells. Such filler, in addition to being firm and relatively rigid, adheres to the frame and surface skin elements when secured in the assembly and has the additional advantages of being rather light in weight, relatively unaffected by reasonable and normal changes of temperature and moisture, and substantially free of any tendency to warp or deform.

In the structure depicted in FIGS. 1, 2 and 6, the frame pieces 29, 30, 32 and 33 of channel sections each have flange portions 36 and 37 connected by an intervening web portion 38, and, as illustrated in FIG. 2, the channels open inwardly of the structure, so that the web portions thereof serve as edge surfaces of the fabricated door or panel. With this structural arrangement, the filler 24 fills the space within the channels, as well as that between the surface skins. The edges of the surface skins are trimmed to flush relationship with the outer surfaces of the web portions 38 of the channels to complete the edges of the fabricated structure. Adhesive is applied between the channel flanges 36 and 37 and the inner margins of the surface skins, as at 39 and 40, so that the frame pieces and surface skins are securely bonded together. The bonding between the filler and the frame pieces, and also between the filler and surface skins, is effected when the filler is scured in place during the fabrication of the structure. As may be readily understood, either the web portions or the flanges of the frame pieces may serve as an anchorage for fastening elements, such as screws, used for the securement of hardware, such as knobs and hinges, to the fabricated doors or panels, as desired in use.

In the modified form of structure, shown in FIG. 3, opposite side frame pieces 29a and 30a are preformed to provide an exposed groove portion 42 in the exposed web portion 38a of the frame piece 29a and a projecting tongue portion 43 is integrally formed on the web portion 38b of the frame piece 30a. The groove portions 42 and the tongue portions 43 of the panels extend longitudinally of the panels and are of sectional shapes and sizes such that they interfit to form a close joint between adjacent panel structures, as in a wall. As in the previously described structure, flange portions 36a, 37a, 36b and 37b of the adjacent panel structures have the margins of surface skins 22a, 23a, 22b and 23b secured thereto, with the filler 24 filling the space within the frame pieces and between the surface skins.

In the modification illustrated in FIG. 4, frame side pieces 29b and 30b of each panel structure are provided with means forming a hinge connection between adjacent panel structures, so that the adjacent panel structures are swingably movable relative to one another, as might be required for use of the panel structures in a garage door or the like. As illustrated, the frame side pieces 29b and 30b of adjacent panels have flange portions 36c, 37c, 36d and 37d to which opposed surface skins 22c, 23c, 22d and 23d are adhered. As in previously described structures, filler 24 fills the space within the frame and between the opposed surface skins. The frame side pieces 29b and 30b have web portions 38c and 38d, respectively. An integral tongue 44 extends longitudinally of, and projects laterally from the mid-region of the web portion 38c of the frame side piece 29b and has a longitudinally extending cylindrical portion 45 integrally formed thereon at the outer end of the tongue 44 and with the axis of the cylindrical outer surface thereof substantially parallel to the side piece web 38c. The web portion 38d of the frame side piece 30b has an integral midportion 46 formed to provide a cylindrical outer surface 47 which extends more than 180 degrees and desirably in the neighborhood of 225 degrees around, and interfits with the cylindrical outer surface of the cylindrical portion 45 on the web portion 38c of the frame side portion 29b of an adjacent panel structure. By having the outer surface 47 encompass substantially more than 180 degrees of the surface of the cylindrical portion 45, the connected adjacent panel structures are movable angularly relative to one another through a limited arc, and the connected panel structures are retained in engagement during normal use.

In the modified structure depicted in FIG. 5, a frame side piece 30c is composed of angle strips 48 and 49 secured together by an intervening element 50 of heat insulating material, such as an extruded plastic strip having opposed channels 52 and 53 in which flange portions 54 and 55 of the angle strips 48 and 49 are securely embedded. In this structure, flanges 56 and 57 on the angle strips 48 and 49, respectively provide opposed and substantially parallel surfaces to which surface skins 22e and 23e are adhered. As in the previously described structures, filler 24 fills the space within the frame and between the opposed surface skins. With this structure, it may be understood that if the angle strips 48 and 49 are made of metal which has relatviely high heat conductivity, the heat conducting path between the angle strips is broken by the intervening insulating element 50, thereby to break that heat conductive path between the surfaces of the panel structure.

FIG. 7 is illustrative of a step utilized in our disclosed method for producing doors, panels and the like of the types shown in FIGS. 1 to 6 inclusive, and is also indicative of one form of apparatus adapted to use in the performance of the method step. As depicted, a blank surface skin 58 of the type herein disclosed and cut to approximate size is clamped between opposed surfaces of clamping elements 59 and 60. A heating device 62 is disposed above the clamping elements 59 and 60 and the surface skin 58, and comprises a supporting frame 63 and a plurality of heating elements, such as 64. The supporting frame 63 and heating elements 64 desirably extend over an area somewhat larger than the surface skin which is to be heated, and, when being used for heating a skin, are disposed in substantially parallel relationship to the surface of the surface skin. In the disclosed structure, the supporting frame 63 and heating elements, when not being used, are movable from the position shown in FIG. 7 to an out-of-the-way position at one side or behind the clamping element 59. In the illustrated apparatus, fans such as 65, driven by motors 65a are disposed above the clamping element 59 for blowing cooling air downwardly against the surface of a surface skin 58 after it has been molded and after the supporting frame 63 and its heating elements have been moved away to cool the skin after molding.

A mold platen 66 is mounted below the surface skin 58 with a mold surface 66a in opposed and substantially parallel relationship to the lower surface of the skin 58. The mold platen 66 has pipes 67 and 68 mounted thereon or therein to carry a heated liquid for heating the mold platen during molding, and to carry a cool liquid for cooling the platen after the molding. The mold platen is mounted on a base 69 and walls 70, which walls and base, together with the platen form a vacuum chamber below the mold platen. A plurality of ducts 72 extend through the mold platen from the mold surface to the vacuum chamber. The frame elements 59 and 60 and the mold platen 66 are relatively movable linearly toward and from one another, so that the surface skin can be moved from the position shown in FIG. 7 to a position in which the surface skin is brought into contact with the platen surface. When the surface skin is brought into engagement with the platen surface, a vacuum pump 73 pumps air through a conduit 74 from the vacuum chamber and through the ducts 72, whereupon the surface skin is brought into intimate contact with the mold platen to effect the impression of an embossed design of a preselected character determined by the configuration of the platen surface upon the heat formable plastic surface skin. Upon being cooled, the surface skin retains the embossed configuration given to it by the preselected platen surface.

After molding and being allowed to cool, each surface skin is trimmed in a manner such as that depicted in FIG. 8. As illustrated, the surface skin 58 having the embossed surface design molded thereon is placed on a table 75, whereon the position of the surface skin is determined by locating blocks such as 76 which are secured to the table and which fit into preselected portions of the embossed design. With this arrangement of parts, the surface skin is trimmed in relation to the embossed design and with such embossed design providing a reference location. As herein shown, the trim cut is made by a cutting instrument, such as a circular saw 77 driven by means, such as an electric motor 78, as the saw is moved linearly along the table or the table 75 is moved longitudinally of the surface panel with respect to the saw 77. In the illustrated apparatus, the table 75 is mounted for linear movement on a supporting base 79. Each marginal portion of the surface skin is thus trimmed to a size at least approximately that desired for the finished door or panel.

After being formed and trimmed, as herein described in respect to panels having decorative surfaces which include embossed designs and after plane surface skins are trimmed to their size for use, they are desirably placed in a preheating chamber 80, as illustrated in FIG. 9. This preheating chamber is utilized to expand the plastic surface skins to the approximate size which they will attain during the fabricating and assembling operations, so that they will not expand appreciably during such operation to produce wrinkles therein, and so that when cooled after the assembly procedure, the surface skins will be taut and devoid of wrinkles and undesirable irregularities.

In the apparatus shown in FIG. 9, the preheating chamber for the surface skins has side walls 82, end walls such as 83, a top wall 84 and a bottom wall 85. Within the chamber 80, shelves 86 and 87, which are desirably foraminous, support stacks 88 of formed skins and stacks 89 of plane skins which are retained therein for a sufficient time pending use to effect the desired full expansion thereof at the temperature to which the chamber is heated. The heating time within the chamber is not a critical factor, inasmuch as the chamber is maintained at a temperature to which the skins are to be heated, and the supply of skins in the chamber is left for a sufficient time for all of them to reach chamber temperature, even when put in at room temperature. As an example, a surface skin of acrylonitrile butadiene styrene of a thickness of .025 inch may be heated to a usable temperature of 110° F. in less than a minute. Thus, by replenishing the supply as skins are used, they are merely brought to and then used, at the temperature of the chamber. Heating elements 90 are mounted within the chamber 80 below the shelves supporting the surface skins, and these heating elements radiate sufficient heat through a screen 92 for effecting the desired heating of the skins and maintaining the chamber temperature. Openings 93 and 94 are provided in the opposite side walls 82 of the heating chamber, through which surface skins are placed in the chamber for heating and withdrawn therefrom for use.

After the surface skins are thus initially treated, the assembly operations for the door or panel are commenced. As shown in FIG. 10, a fixture 95 for locating and retaining the door or panel parts in position during assembly includes a base plate 96 to which a series of spaced and aligned side blocks 97 and 98 and similar spaced and aligned end blocks 99 are secured. The side blocks 97 and 98, and also the end blocks 99 are in opposed and parallel relationship to one another for the production of rectangular doors or panels, as shown herein. The aligned side blocks 97 and the aligned side blocks 98 have bars 100 and 102 mounted for rotation therein and extending longitudinally therethrough. Likewise, a bar 101 is mounted for rotation in the end blocks 99 and extends through end blocks 105. Each of the bars 100 and 102 is suitably linked mechanically to locating studs 103 and 104 located in the mid-region of each block and slidable linearly for moving the studs between extended positions, as shown, and retracted position in which their end surfaces are flush with the surfaces of the side blocks. Similar locating studs 105 are also mounted in the end blocks such as 99 and are moved between like extended and retracted positions by the bar 101. When the locating studs in the side and end blocks are retracted, a surface skin supporting plate 107 can be placed in position in the fixture to be supported on the base plate 96 and located thereon by the inner side surfaces of the side blocks 97 and 98 and the end blocks such as 99. For each particular panel design, the supporting plate 107 has recesses 108 therein for accommodating projecting portions of the embossed design, such as the frame portions 25. When the skins are to be flat, the surface of the supporting plate 107 may also be flat. The surface skin 58 is placed in the fixture 95, as shown in FIG. 10, with the embossed portions 25 disposed in the recesses 108, whereupon the surface skin is backed and supported by the supporting plate.

Although adhesive is not always required for securing the frame side pieces 29 and 30 and the end pieces 32 and 33 to the margins of the surface skins, it may be desirable.

When adhesive is desired, it may be applied to the opposed outer surfaces of the flange portions 36 and 37 by apparatus of the type illustrated in FIG. 11. In the disclosed apparatus, rollers 109 and 110 are supported for rotation on shafts 112 and 113 respectively, which shafts are journaled in supporting bearings 114 and 115. At least one of the rollers is adapted to be driven by means such as a crank 116. The roller 110 dips into adhesive 118 in a pan 119 below the roller, so that the roller carries the adhesive to one surface of each of the frame pieces. Adhesive 120 is applied to the roller 109 from a container 122 through a conduit 123 and a header which extends longitudinally of the upper roller surface. As the frame pieces pass between the opposed rollers in contact therewith, a coating of adhesive is applied to the opposed outer flange surfaces thereof.

After the adhesive has been applied to the surfaces of the frame pieces, they are placed in position on the surface skin 58 in the fixture 95, as shown in FIG. 12. The studs 103 and 104 abut the webs 38 of the frame side pieces 29 and 30 and serve as locators for those pieces, while the studs such as 105 serve as locators for the frame and pieces 32 and 33. When thus located in the fixture by the studs, the outer surfaces of the webs of the frame pieces are generally flush with the edges of the surface skin 58.

With the frame pieces thus located and adhered in position in the manner described in respect to FIG. 12, a predetermined amount of the uncured filler is applied to the inner surface of the surface skin 58 within the confines of the frame pieces 29, 30, 32 and 33, as shown in FIG. 13. As diagrammatically shown in FIG. 13, uncured filler 125 is applied to the inner surface of the surface skin from a nozzle 126. With the polyurethane or polymeric urethane materials, the nozzle 126 serves as a mixer for two or more components which together constitute the uncured filler 125. One of the components is supplied to the nozzle from a container 127 through a conduit 128. The other component is supplied to the nozzle from a container 129 through a conduit 130.

It is desirable not only to have a predetermined quantity of the uncured filler supplied to each door or panel, depending upon the volume to be filled by the cured filler, but also to have the uncured filler distributed along the length of the surface skin of the door or panel. Such lengthwise distribution of the filler along the inner surface of the usrface skin 58 requires relative movement between the fixture and surface skin and the nozzle 126 during the emission of uncured filler from the nozzle for a predetermined period of time. The nozzle, of course, is pre-adjusted to mix predetermined quantities of the components of the filler and emit a predetermined amount of the uncured filler per unit of time. Thus, to distribute the desired amount of uncured filler material along the inner surface of the surface skin 58, either the nozzle 126 may be moved linearly at a selected rate along the surface skin, or the fixture and surface skin may be moved longitudinally relative to the nozzle at a selected linear rate. In the structure shown in FIG. 13, the base plate 96 of the fixture 95 is mounted on a conveyor element 132 which moves linearly on rollers such as 133 and 134 which are mounted at spaced positions on shafts 135. The rate of discharge of uncured filler from the nozzle 126 is determined with respect to the rate of movement of the fixture on the conveyor element so that the predetermined amount of uncured filler is discharged from the nozzle 126 as the conveyor moves almost the full length of the door or panel.

After the uncured filler is applied to the inner surface of the surface skin 58 in the manner described with respect to FIG. 13, and before the adhesive applied to the flange portions of the frame pieces has set, the second or back surface skin 22 is placed upon the exposed upper surfaces of the flanges of the frame pieces for adhesion thereof by the adhesive on the frame pieces. The frame pieces and opposed surface skins thus define a cavity therebetween and wherein the uncured filler 125 is applied along the length of the surface skin 58.

As shown in FIG. 15, and when the back surface skin 22 is plane, a flat retaining plate 140 is placed against the surface of the surface skin 22 to retain that surface skin in position and to maintain its flat surface contour during the curing and expansion of the uncured filler. In the structure shown in FIG. 15, handles such as 142 are secured to the surface of the plate 140 for use in effecting the placement of the plate.

With the door or panel assembly thus made, the uncured filler is cured and expanded within the door or panel structure. Heat assists and promotes the expansion and curing of the filler material. Materials of the type disclosed herein generate some heat themselves by and during the reaction, and could expand and cure by that heat alone at reasonable room temperatures. However, the application of heat to the assembly for a predetermined period of time speeds the conclusion of the curing reaction. The temperature to which the uncured filler is subjected for effecting the expansion and curing and the length of curing time also vary quite widely with the compounding of the urethane material utilized. The density of the cured filler is also affected to some extent by the curing temperature. Thus, even the temperature of the preheated skin into which the uncured filler is deposited has some effect upon the curing time and final density. As an example, one urethane compound may cure completely in from four to five minutes at a temperature of 110° F., while another urethane compound may require a much longer period, even up to an hour, while subjected to a temperature of 200° F. Either cured filler may be entirely satisfactory and suitable for use in the disclosed door or panel structure. Thus, the filler is compounded to provide a rate of curing which is suitably matched to the density desired and the time required for other steps of the production process.

For effecting the curing of the filler, a plurality of the fixtures 95 having the door or panel assemblies therein, as shown in FIG. 15, are sequentially placed in a curing oven 143, as shown in FIG. 16. Shelves 144, disposed one above the other, in the oven 143 are provided to support the individual fixtures and their contained door or panel assemblies. To insure tight retension of the positions of the parts in the door or panel assemblies within their respective fixtures, clamp arms 145 are swingably supported relative to the upper ends of arms 146, the lower ends of which arms are secured to the shelves 144. Outer end portions 147 of the clamp arms 145 are each pivotally connected to an acutating rod 148. One end of each of the actuating rods is movable by the action of a hydraulic ram 149 to move the clamp arms 145 relative to the arms 146 between clamping positions shown in FIG. 16 and raised positions in which the fixtures are free to be removed from or placed upon the shelves 144. When the clamp arms 145 are in their clamping position, as shown in FIG. 16, they bear against opposite side regions of the retaining plates 140. It may be understood that a plurality of such clamp arms 145 are utilized along the length of each fixture and its contained door or panel; the number depending to some extent upon the length of the door or panel being fabricated.

The curing oven 143, in the form disclosed, has a back wall 150, a top wall 152, a bottom 153 and a front wall 154, as well as end walls such as 156. The front wall 154 has openings 157 therein through which the fixtures 95 are inserted into, and removed from the oven. As shown in FIGS. 16 and 17, electrical heating elements such as 158 are mounted in the lower portion of the oven below a screen or foraminous wall 159. Also, an inner wall 160 is spaced from the end wall 156 and provides a header space 162 at one end of the oven. In the disclosed oven, a fan 163 driven by motor 164 and mounted near the heating elements 158 in the lower portion of the oven is utilized for the circulation of heated air within the oven.

Conduits 165 communicate with the header space 162 through the inner wall 160 and disseminate heated air along adjacent fixtures 96 through open longitudinal slots 166 to assist in the distribution of heat. In the disclosed oven, the conduits 165 extend along the lower ones of the assemblies which are disposed within the oven.

While being thus heated within the curing oven 143, the uncured filler 125 cures and expands to fill the interior of the fabricated door or panel between its surface skins and within the frame pieces. Air displaced by the curing and expansion of the filler may be exhausted through vent holes provided in the frame pieces, but in the disclosure structure, the spaces at the corners of the doors or panels between the bevelled and abutting ends of the frame pieces afford an adequate outlet for the air. Also, if there is any excess of filler, this excess may also escape from the interior of the door or panel structure between the ends of the frame pieces, from whence it may be trimmed by a cutting tool after the filler has reached its cured and set state. Normally, the filler completely fills the space between the surface skins of the panel and within the frame pieces. In curing, the filler bonds itself to the surface skins and to the inner surfaces of the frame pieces.

After the curing of the filler has been completed by the application of heat for a prescribed period of time in the curing oven 143, the clamp arms 145 are released by action of the hydraulic ram 149, and the fixtures, with their contained panel structures, are removed from the curing oven and allowed to cool. Since the surface skins were preheated prior to assembly and prior to the curing of the filler and remain warm during the steps of assembly, the contraction thereof during the cooling of each assembly tends to insure the tautness of the surface skins and their freedom from wrinkles or waves when cooled.

From the foregoing description and by reference to the accompanying drawings, it may be understood that the disclosed structure which is adapted to use as a fabricated door, panel or the like is made from a relatively small number of uncomplicated parts by relatively inexpensive and easily accomplished method steps which result in a finished ensemble in which the parts and the ensemble are relatively uneffected by variations in temperature between normal limits and by variations in moisture content of the air and are free of tendency to warp, as well as having good heat insulating qualities. The panels may also be made in a variety of shapes and sizes and are subject to wide variations in the ornamental designs which may be applied to either one or both surfaces thereof. In the completely fabricated door or panel structures, the panels may embody either projecting or concave surface design patterns, and in either instance, the filler conforms to the embossed surface pattern to provide support for the surface skins throughout the patterned area or areas.

It may also be readily understood that the disclosed method is subject to accomplishment by series of readily accomplished and sequential steps which can be carried on by apparatus which is entirely feasible and within the range of normal production processes. Although the disclosed structural ensemble is made of a plurality of parts of different materials, the resultant structure, when made in the manner disclosed, is unitary in nature with the parts well bonded together to provide a structure suitable for a variety of uses. The method is also well suited to the production of door or panel structures having variations in detail, such as those disclosed, without changing the basic types of apparatus utilized or the steps and sequences set forth.

It is understood that the foregoing description is merely illustrative of a preferred embodiment of the invention and that the scope of the invention therefore is not to be limited thereto but is to be determined by the appended claims.

We claim:

1. A method of fabricating doors, panels and the like and which comprises the steps of selecting sheet plastic back and front surface skins of predetermined sizes and shapes, molding the front surface skin under heat and pressure to provide an embossed surface design thereon, heating both skins to a predetermined temperature to effect processing expansion of the plastic materials, adhesively securing relatively stiff frame elements of substantial thickness to the margins of one of said surface skins while flat to form a marginal frame therefor and thereon, applying a predetermined quantity of an uncured and expandable heat curable foam type plastic material to said one surface skin within the confines of said marginal frame adhesively securing the other surface skin to the surfaces of said frame elements opposite said one skin, confining the assembled marginal frame and surface skins between mold plates, one of which has recesses disposed to receive projecting embossed portions of said front surface skin, and then heating the assembled frame, surface skins and mold plates to effect curing of the said foam type plastic material.

2. A method of fabricating doors, panels and the like as defined in claim 1, and further characterized by the steps of trimming the front and back skins to substantially flush relationship to the outer surfaces of said frame.

3. A method of fabricating doors, panels and the like as defined in claim 1, and wherein the predetermined quantity of an uncured and expandable heat curable foam type plastic material is calculated to fill substantially the entire cavity within the frame elements and between the front and back skins when the said foam type plastic material is cured.

4. A method of fabricating doors, panels and the like as defined in claim 1, and further characterized by the step of trimming the longitudinal edges of said front surface skin to provide parallel longitudinal edges in a predetermined spaced relationship to said embossed surface design.

5. A method of fabricating doors, panels and the like and which comprises the steps of selecting sheet plastic back and front surface skins of predetermined sizes and shapes, molding the front surface skin under heat and pressure to provide an embossed surface design thereon, adhesively securing relatively stiff frame elements of substantial thickness to the margins of the inner surface of the front surface skin while said front surface skin is flat against a mold plate having surface contours conforming generally to those of the outer surface of the front surface skin, applying a predetermined quantity of an uncured and expandable heat curable foam type plastic material to the inner surface of the front surface skin within the confines of said marginal frame, adhesively securing said back surface skin to the surfaces of said frame elements opposite the front skin, securing a mold plate over the outer surface of the back surface skin which conforms to the surface contours of the back surface skin, and then heating the assembled frame, surface skins and mold plate to effect curing of the said foam type plastic material.

6. A method of fabricating doors, panels and the like and which comprises the steps of cutting sheet plastic back and front surface skins to predetermined sizes and shapes, bonding relatively stiff frame elements of substantial thickness compared to that of the skins to the margins of the inner surface of one of the surface skins to provide a marginal frame on said one of the surface skins while said frame elements and the last mentioned skin are in substantially planar relationship, applying a predetermined quantity of an uncured, expandable and hardenable light weight filler material to said one of the surface skins within the confines of said marginal frame, bonding the other surface skin to the surfaces of said frame elements opposite those to which said one of the surface skins is bonded, securing the outer surfaces of the surface skins between relatively rigid members conforming generally to the surface contours thereof, and then providing time for said expandable and hardenable filler materials to cure to a solid state in which it substantially fills the space within the frame and between the front and back surface skins.

7. A method of fabricating doors, panels and the like as defined in claim 4, and characterized further in that said filler material bonds itself to both the front and back surface skins and to said frame elements.

8. A method of fabricating doors, panels and the like as defined in claim 4, and further characterized by the steps of heating the surface skins to effect expansion thereof prior to and during the time that they are bonded to the frame elements, and by the curing of the hardenable filler materials by the application of heat thereto.

9. A method of fabricating doors, panels and the like and which comprises the steps of securing a plastic surface skin to one surface of a relatively stiff and rigid frame of greater thickness than the surface skin, applying to the interior surface of said surface skin within said frame a predetermined quantity of an uncured, expandable foam type plastic filler material which cures to a stiff and light weight state, securing a second plastic surface skin to the opposite surface of the frame to substantially confine said filler material within the frame and between said surface skins, and then curing the filler material to substantially fill the space within the frame and between said surface skins while confining the outer surfaces of the surface skins between opposed rigid surfaces.

10. In a method of fabricating doors, panels and the like from relatively flexible plastic surface skins secured to opposite sides of a relatively rigid frame of greater thickness then the surface skins and having an interior space filled with a heat curable plastic filler material, the steps of expanding the surface skins by heat applied prior to, and retained during the assembly of the surface skins with the frame and filler material, and then curing the filler material by the application of heat to the said assembly, after which the surface skins shrink to a taut condition on the frame.

References Cited
UNITED STATES PATENTS

| | | | |
|---|---|---|---|
| 3,024,701 | 3/1962 | Marks et al. | 156—242X |
| 3,131,514 | 5/1964 | Siek | 156—242X |
| 3,272,900 | 9/1966 | Ryan et al. | 156—242X |
| 3,393,107 | 7/1968 | Wilburn | 156—242 |

CARL D. QUARFORTH, Primary Examiner

S. J. LECHERT, Jr., Assistant Examiner

U.S. Cl. X.R.

156—108, 109, 146, 219, 228, 242, 245, 256, 267, 292, 295, 322; 161—161